United States Patent
Wada (10) Patent No.: US 8,031,235 B2
(45) Date of Patent: Oct. 4, 2011

(54) IMAGING APPARATUS AND SIGNAL PROCESSING METHOD

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 389 days.

(21) Appl. No.: 12/414,412

(22) Filed: Mar. 30, 2009

(65) Prior Publication Data

US 2009/0244350 A1    Oct. 1, 2009

(30) Foreign Application Priority Data

Apr. 1, 2008 (JP) .................. P2008-095396
Mar. 12, 2009 (JP) .................. P2009-059368

(51) Int. Cl.
*H04N 5/228* (2006.01)
*H04N 3/14* (2006.01)
*H04N 5/262* (2006.01)
*H04N 5/235* (2006.01)

(52) U.S. Cl. .............. 348/222.1; 348/315; 348/239; 348/296; 348/229.1

(58) Field of Classification Search .......... 348/294–324, 348/248, 239, 222.1, 221.1, 220.1, 229.1, 348/272, 275, 280, 367
See application file for complete search history.

(56) References Cited

U.S. PATENT DOCUMENTS

| | | | |
|---|---|---|---|
| 6,831,692 B1 * | 12/2004 | Oda | 348/315 |
| 6,999,119 B1 | 2/2006 | Shibazaki et al. | |
| 7,355,156 B2 * | 4/2008 | Suzuki | 250/208.1 |
| 7,440,019 B2 * | 10/2008 | Suzuki et al. | 348/315 |
| 7,551,217 B2 * | 6/2009 | Oda et al. | 348/315 |
| 7,944,496 B2 * | 5/2011 | Sakamoto | 348/315 |
| 2004/0017497 A1 | 1/2004 | Suzuki et al. | |
| 2004/0262493 A1 | 12/2004 | Suzuki | |
| 2009/0262215 A1 | 10/2009 | Sano et al. | |

FOREIGN PATENT DOCUMENTS

| | | |
|---|---|---|
| JP | 7-250286 A | 9/1995 |
| JP | 2000-69491 A | 3/2000 |
| JP | 2004-055786 A | 2/2004 |
| JP | 2004-336469 A | 11/2004 |
| JP | 2008-66937 A | 3/2008 |

* cited by examiner

*Primary Examiner* — Lin Ye
*Assistant Examiner* — Marly Camargo
(74) *Attorney, Agent, or Firm* — Birch, Stewart, Kolasch & Birch, LLP (57) ABSTRACT

An imaging apparatus includes a solid-state imaging device. The solid-state imaging device includes a plurality of photoelectric conversion units having plural first photoelectric conversion units and plural second photoelectric conversion units, a drive section and a signal processing section. The drive section controls the solid-state imaging device to read first pixel signals that are accumulated over an exposure period, from the first photoelectric conversion units, respectively, to read low-sensitivity pixel signals from the second photoelectric conversion units, respectively, to read second pixel signals that are accumulated in at least a part of the exposure period, from the second photoelectric conversion units, to mix the first pixel signals and the second signals for producing a high-sensitivity pixel signals. The signal processing section combines the low-sensitivity pixel signals and the high-sensitivity pixel signals and produces an image.

12 Claims, 7 Drawing Sheets

IMAGING APPARATUS AND SIGNAL PROCESSING METHOD

CROSS-REFERENCE TO RELATED APPLICATIONS

This application claims the benefit of Japanese Patent Application Nos. 2008-95396, filed Apr. 1, 2008, and 2009-59368, filed Mar. 12, 2009, the entire contents of which are hereby incorporated by reference, the same as if set forth at length.

BACKGROUND OF THE INVENTION

1. Field of the Invention

The present invention relates to an imaging apparatus and a signal processing method for the same.

2. Description of Related Art

As an imaging apparatus such as a digital camera or the like, there has been known an imaging apparatus in which adopted is a process for consecutively performing high-sensitivity photographing and low-sensitivity photographing within a short period of time and synthesizing the obtained two images in order to obtain an image with a wide dynamic range.

In an imaging apparatus including a solid-state imaging device having relatively high-sensitivity photoelectric conversion units and relatively low-sensitivity photoelectric conversion units, an image having a wide dynamic range is produced by synthesizing signal charges from the high-sensitivity photoelectric conversion units and signal charges from the low-sensitivity photoelectric conversion units. For example, JP 2004-55786 A (corresponding to US 2004/0017497 A), JP 2004-336469 A (corresponding to US 2004/0262493 A) and JP Hei.7-250286 A describe this type of solid-state imaging device.

SUMMARY OF THE INVENTION

However, when an image photographed at a high sensitivity and an image photographed at a low sensitivity are synthesized, since the two images are not simultaneously photographed, that is, temporal correlation therebetween is low, there is a room for improvement in unnatural synthesized image.

In addition, when signal charges are read from the high-sensitivity photoelectric conversion units and the low-sensitivity photoelectric conversion units for the purpose of increasing the dynamic range, if an exposure amount is small, noise would be increased. Moreover, in order to further increase the sensitivity to cope with a high-speed shutter, pixel mixing is required.

In JP Hei.7-250286 A, the dynamic range is increased by performing pixel mixing for plural types of signal charges. However, because the signal charges obtained from the low-sensitivity pixels are also mixed and the sensitivity of the low-sensitivity pixels is enhanced, it is difficult to control an exposure period.

The present invention has been made in view of the foregoing circumstances, and to the invention provides an imaging apparatus capable of increasing the dynamic range by synthesizing signal charges generated in relatively high-sensitivity photoelectric conversion units and signal charges generated in relatively low-sensitivity photoelectric conversion units while preventing a reduction in temporal correlation between the high-sensitivity and low-sensitivity photoelectric conversion units, and an image signal processing method for the imaging apparatus.

(1) According to an aspect of the invention, an imaging apparatus includes a solid-state imaging device. The solid-state imaging device includes a plurality of photoelectric conversion units, a drive section and a signal processing section. The plurality of photoelectric conversion units have plural first photoelectric conversion units and plural second photoelectric conversion units that are regularly arranged on a semiconductor substrate. The drive section controls the solid-state imaging device to read first pixel signals that are accumulated over an exposure period, from the first photoelectric conversion units, respectively, to read low-sensitivity pixel signals from the second photoelectric conversion units, respectively, to read second pixel signals that are accumulated in at least a part of the exposure period, from the second photoelectric conversion units, and to mix the first pixel signals and the second signals and produce high-sensitivity pixel signals. The signal processing section combines the low-sensitivity pixel signals and the high-sensitivity pixel signals and produces an image.

(2) In the imaging apparatus of (1), the first photoelectric conversion unit and the second photoelectric conversion unit, which correspond to an identical color and are to be mixed, may be disposed at positions adjacent to each other on the semiconductor substrate.

(3) In the imaging apparatus of (1), the photoelectric conversion units may be disposed on a surface of the semiconductor substrate in row and column directions. The first photoelectric conversion units and the second photoelectric conversion units may be arranged at an identical arrangement pitch at positions shifted from each other in the row and column directions by one half of the arrangement pitch.

(4) The imaging apparatus of (3) may further include a vertical transfer section and a horizontal transfer section. The vertical transfer section transfers signal charges that are read from the photoelectric conversion units, in the column direction. The horizontal transfer section transfers the signal charges, which are transferred from the vertical transfer section, in the row direction. The vertical transfer section includes a plurality of vertical transfer channels, a plurality of vertical transfer electrodes and charge reading areas. The plurality of vertical transfer channels are formed on the semiconductor substrate so as to correspond to the photoelectric conversion units being disposed in the column direction. Each of the vertical transfer electrodes is formed so as to intersect the plurality of vertical transfer channels. The charge reading areas read the signal charges of the photoelectric conversion units into the vertical transfer channels. The first pixel signals and the second signals are mixed in the horizontal transfer section.

(5) In the imaging apparatus of (1), the photoelectric conversion units may be disposed on a surface of the semiconductor substrate in row and column directions. The first photoelectric conversion units and the second photoelectric conversion units may be arranged at an identical arrangement pitch in an arrangement obtained by slanting a square lattice configuration having a 2×2 period.

(6) The imaging apparatus of (5) may further include a vertical transfer section and a horizontal transfer section. The vertical transfer section transfers signal charges that are read from the photoelectric conversion units, in the column direction. The horizontal transfer section transfers the signal charges, which are transferred from the vertical transfer section, in the row direction. The vertical transfer section includes a plurality of vertical transfer channels, a plurality of vertical transfer electrodes and charge reading areas. The plurality of vertical transfer channels are formed on the semiconductor substrate so as to correspond to the photoelectric conversion units being disposed in the column direction. Each of the vertical transfer electrodes is formed so as to intersect the plurality of vertical transfer channels. The charge reading areas read the signal charges of the photoelectric conversion units into the vertical transfer channels. The first pixel signals and the second signals are mixed in the vertical transfer section or the horizontal transfer section.

(7) According to another aspect of the invention, an imaging apparatus includes a solid-state imaging device. The solid-state imaging device includes a plurality of photoelectric conversion units having plural first photoelectric conversion units and plural second photoelectric conversion units that are regularly arranged on a semiconductor substrate. A signal processing method for the imaging apparatus includes: reading first pixel signals that are accumulated over an exposure period, from the first photoelectric conversion units, respectively; reading low-sensitivity pixel signals from the second photoelectric conversion units, respectively; reading second pixel signals that are accumulated in at least a part of the exposure period, from the second photoelectric conversion units; mixing the first pixel signals and the second pixel signals to produce a high-sensitivity pixel signal; mixing the low-sensitivity pixel signals and the high-sensitivity pixel signals to produces an image.

(8) In the method of (7), wherein the first photoelectric conversion unit and the second photoelectric conversion unit, which correspond to identical color and are to be mixed, may be disposed at positions adjacent to each other on the semiconductor substrate.

(9) In the method of (7), the photoelectric conversion units may be disposed on a surface of the semiconductor substrate in row and column directions. The first photoelectric conversion units and the second photoelectric conversion units may be arranged at an identical arrangement pitch at positions shifted from each other in the row and column directions by one half of the arrangement pitch.

(10) The method of (9) may further include: transferring signal charges read from the photoelectric conversion units in the column direction, by a vertical transfer section; and transferring the signal charges, which are transferred from the vertical transfer section, in the row direction by a horizontal transfer unit. The vertical transfer section includes a plurality of vertical transfer channels, a plurality of vertical transfer electrodes and charge reading areas. The plurality of vertical transfer channels are formed on the semiconductor substrate so as to correspond to the photoelectric conversion units being disposed in the column direction. Each of the vertical transfer electrodes is formed so as to intersect the plurality of vertical transfer channels. The charge reading areas read the signal charges of the photoelectric conversion units into the vertical transfer channels. The first pixel signals and the second signals are mixed in the horizontal transfer section.

(11) In the method of (7), the photoelectric conversion units may be disposed on a surface of the semiconductor substrate in row and column directions. The first photoelectric conversion units and the second photoelectric conversion units may be arranged at an identical arrangement pitch in an arrangement obtained by slanting a square lattice configuration having a 2×2 period.

(12) The method of (11) may further include: transferring signal charges read from the photoelectric conversion units in the column direction, by a vertical transfer section; and transferring the signal charges from the vertical transfer section in the row direction, by a horizontal transfer section. The vertical transfer section includes a plurality of vertical transfer channels, a plurality of vertical transfer electrodes and charge reading areas. The plurality of vertical transfer channels are formed on the semiconductor substrate so as to correspond to the photoelectric conversion units being disposed in the column direction. Each of the vertical transfer electrodes is formed so as to intersect the plurality of vertical transfer channels. The charge reading areas read the signal charges of the photoelectric conversion units into the vertical transfer channels. The first pixel signals and the second signals are mixed in the vertical transfer section or the horizontal transfer section.

With the above configuration, since an image can be produced by synthesizing first pixel signals obtained from the first photoelectric conversion units (for example, high-sensitivity photoelectric conversion units) and second pixel signals obtained from the second photoelectric conversion units (for example, low-sensitivity photoelectric conversion units), a wide dynamic range can be achieved. Moreover, by mixing low-sensitivity pixels signals obtained from the second photoelectric conversion units and the high-sensitivity pixel signals, signals with higher sensitivity can be obtained so that the dynamic range can be further expanded. Because the quantity of charges is increased by detecting a part of high-sensitivity information using the second photoelectric conversion units and performing the mixing, further improved noise reduction can be achieved as compared with a process for detecting the high-sensitivity information only from the first photoelectric conversion units.

In addition, because the second pixel signals, which are to be mixed with the high-sensitivity pixel signals, are detected during an exposure period for the second photoelectric conversion units, the exposure period for the overall pixels can be substantially shortened. Moreover, the temporal correlation between the exposure periods for the high-sensitivity signals and the low-sensitivity signals is enhanced so that a more natural image can be produced when, e.g., a subject in motion is photographed. At this time, since the low-sensitivity pixel signals are not mixed with the high-sensitivity pixel signals, the low-sensitivity signals can be detected without an exposure control such as a high-speed electronic shutter or the like being extremely shortened at the time of exposure of the low-sensitivity pixel signals.

When the exposure period for detecting the low-sensitivity pixel signals and the second pixels signals in the second photoelectric conversion units overlaps the exposure period for detecting the first pixel signals in the first photoelectric conversion units, since the first photoelectric conversion units and the second photoelectric conversion units can be exposed simultaneously, the correlation between the signal charges thereof can be further enhanced.

The terms "high-sensitivity" and "low-sensitivity" used herein include (i) the case where the photoelectric conversion units are differently structured so that signal charges that are detected in the respective photoelectric conversion units during the same exposure period, i.e., in response to the same light quantity of the exposure are different, and (ii) the case where the photoelectric conversion units have the same structure and the photoelectric conversion units are caused to have relatively different sensitivities by setting different exposure periods, i.e., by applying different light quantities of the exposure.

In other words, the difference between the sensitivities of the high-sensitivity photoelectric conversion units and the low-sensitivity photoelectric conversion units may be provided by a structural difference therebetween, or the photoelectric conversion units have the same structure and a sensitivity difference is given by controlling their exposure periods.

When, among the photoelectric conversion units corresponding to the same color, the first photoelectric conversion units and the second photoelectric conversion units are disposed at positions adjacent to each other in an arrangement on the semiconductor substrate, the correlation between the pixel signals thereof can be further enhanced.

With the above configuration, it is possible to provide an imaging apparatus and a signal processing method for the imaging apparatus that can expand the dynamic range by combining signal charges generated by the high-sensitivity photoelectric conversion units and signal charges generated by the low-sensitivity photoelectric conversion units, while preventing a temporal correlation therebetween from being deteriorated.

DETAILED DESCRIPTION OF EMBODIMENTS OF THE INVENTION

Embodiments of the present invention will be described below in detail with reference to the drawings.

Figure 1:
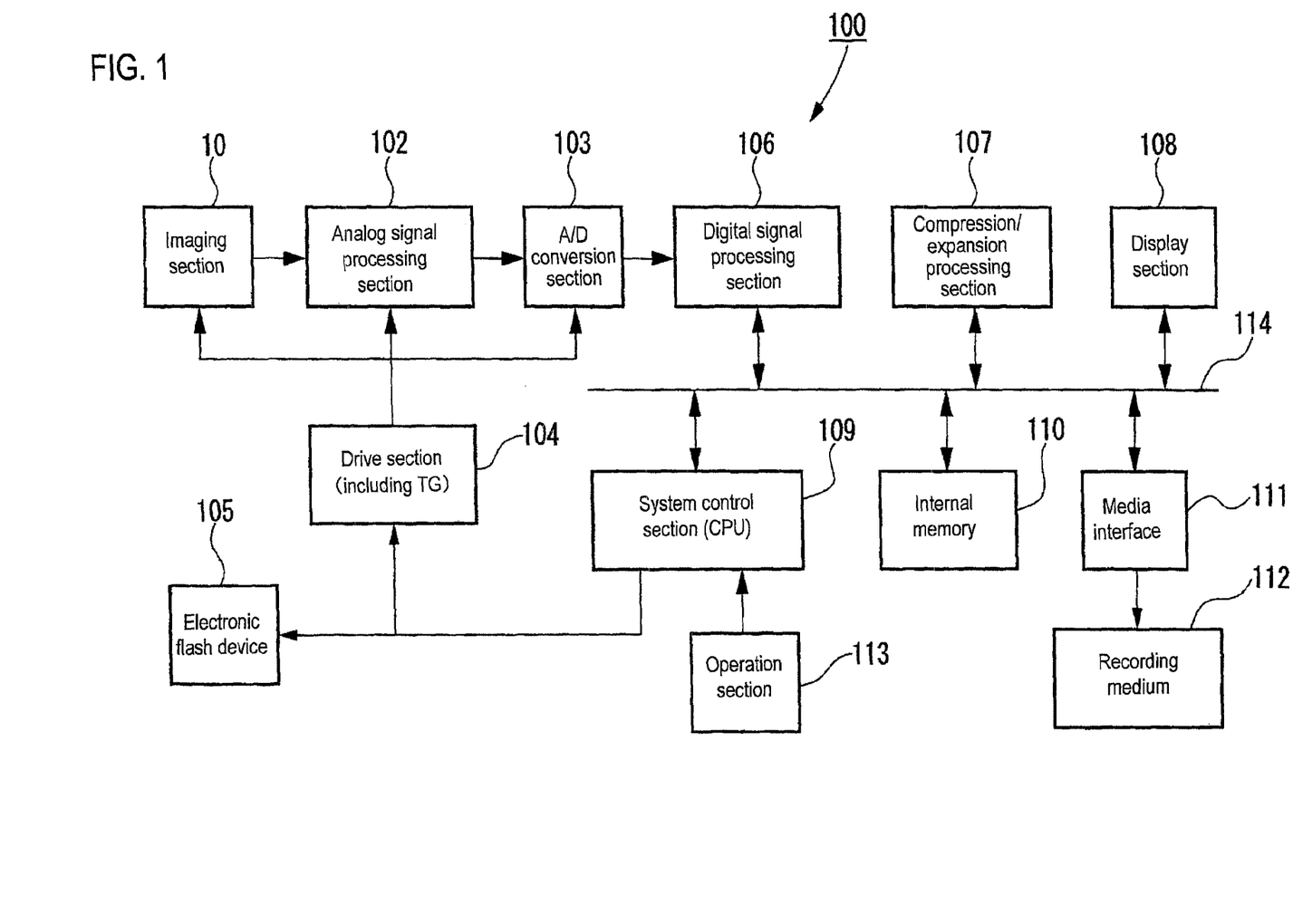
FIG. 1 is a view showing t schematic structure of an imaging apparatus of an embodiment according to the present invention.

FIG. 1 is a view showing a schematic structure of an imaging apparatus of the embodiment according to the present invention. In the present embodiment, a description will be given using the structure of a digital camera as one example of the imaging apparatus. An imaging apparatus 100 shown in FIG. 1 has an imaging section 10, an analog signal processing section 102, an A/D conversion section 103, a drive section 104, an electronic flash device 105, a digital signal processing section 106, a compression/expansion processing section 107, a display section 108, a system control section 109, an internal memory 110, a media interface 111, a recording medium 112, and an operation section 113. Each of the digital signal processing section 106, the compression/expansion processing section 107, the display section 108, the system control section 109, the internal memory 110, and the media interface section 111 is connected to a system bus 114.

The imaging section 10 photographs a subject using an optical system such as a photographing lens and the like and a solid-state imaging device described later, and outputs an analog imaging signal. The imaging section 10 includes a mechanical shutter for performing shutting control with respect to an incidence of light to the solid-state imaging device. The analog signal processing section 102 performs predetermined analog signal processing for the imaging signal obtained in the imaging section 10. The A/D conversion section 103 converts the analog signal for which the analog signal processing section 102 has performed the predetermined processing, into a digital signal. An output of the A/D conversion section 103 is sent to the digital signal processing section 106 as what is called RAW image data. The RAW image data is digital image data that is obtained by digitalizing the imaging signal from the imaging section 10 without changing the format of the imaging signal from the imaging section 10.

At the time of photographing, control of the optical system, the mechanical shutter, and the solid-state imaging device is performed via the drive section 104. The solid-state imaging device is driven with a drive signal from a timing generator (described as TG in FIG. 1) included in the drive section 104 at a predetermined timing in response to an ON state of a two-step release switch (not shown) that is caused by an operation of a release button (not shown) that is a part of the operation section 113. The system control section 109 causes the drive section 104 to output a predetermined drive signal.

The digital signal processing section 106 performs digital signal processing in accordance with an operational mode set by the operation section 113, for the digital image data from the A/D conversion section 103. The processing performed by the digital signal processing section 106 includes black level correction processing (OB processing), linear matrix correction processing, white balance adjustment processing, gamma correction processing, image combining processing, synchronization processing, and Y/C conversion processing. The digital signal processing section 106 is implemented by, e.g., a DSP.

The compression/expansion processing section 107 performs compression processing for Y/C data obtained in the digital signal processing section 106, and also performs expansion processing for compressed image data obtained from the recording medium 112.

The display section 108 is configured so as to include, e.g., a LCD display device, and displays an image based on the image data photographed and subjected to the digital signal processing. The display section 108 also displays an image based on the image data obtained by performing the expansion processing for the compressed image data recorded in the recording medium 112. In addition, the display section 108 can also display a through image (live view image) at the time of photographing, various states of the digital camera, information regarding operations, and the like.

The internal memory 110 is, e.g., a DRAM, and is used as a work memory for the digital signal processing section 106 and/or the system control section 109 as well as a buffer memory for temporarily storing photographed image data to be recorded in the recording medium 112 and a buffer memory for display image data to be displayed on the display section 108. The media interface 111 inputs/outputs data to/from the recording medium 112 such as a memory card.

The system control section 109 is configured mainly of a processor that is operated by a predetermined program, and performs control of the entire digital camera, including a photographing operation.

The operation section 113 is used to perform various operations when the digital camera is in use, and includes the release button and the like.

The digital camera shown in FIG. 1 is capable of changing the setting of photographing sensitivity. For example, with regard to a film speed, the digital camera can be switched between a low-sensitivity photographing mode in which photographing is performed at a sensitivity corresponding to an ISO speed of 100 and a high-sensitivity photographing mode in which photographing is performed at any of sensitivities corresponding to the ISO speeds of 200, 400, and 800.

Figure 2:
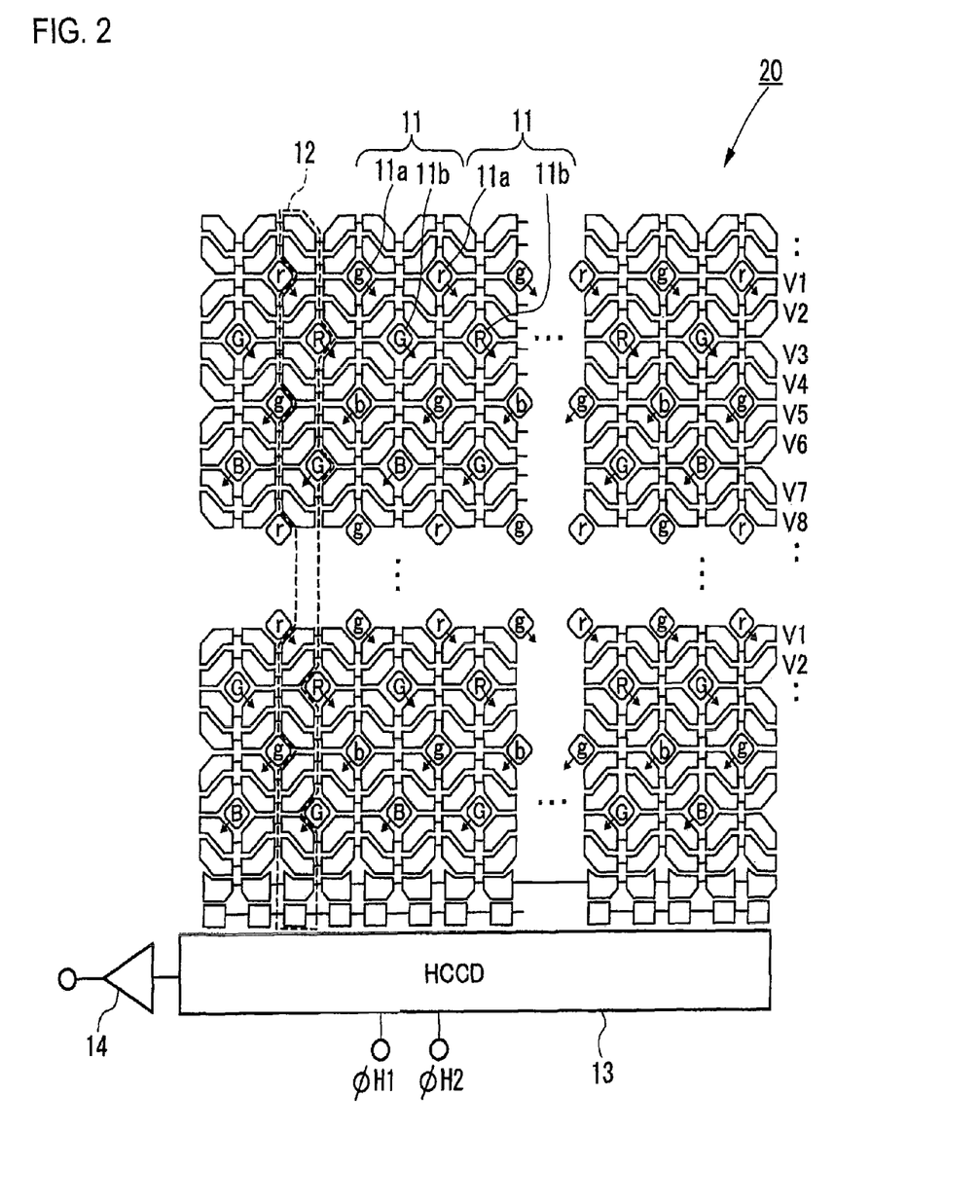
FIG. 2 is a schematic plan view for illustrating a structure of a solid-state imaging device of the present embodiment.

FIG. 2 is a schematic plan view for illustrating a structure of the solid-state imaging device according to the present embodiment. In the solid-state imaging device, a plurality of photoelectric conversion units 11 such as photodiodes are two-dimensionally arranged on a light receiving area of a semiconductor substrate. In the present embodiment, each of the photoelectric conversion units 11 corresponds to one pixel constituting an image, and may also be simply referred to as a pixel.

When a vertical direction is assumed to be a column direction, and a horizontal direction is assumed to be a row direction in FIG. 2, the photoelectric conversion units 11 are provided in the row and column directions on the surface of the semiconductor substrate, and the photoelectric conversion units 11 in odd rows and the photoelectric conversion units 11 in even rows are arranged with being shifted by one half of a pitch (what is called a "honeycomb pixel arrangement"). In the present embodiment, the photoelectric conversion units 11 include high-sensitivity photoelectric conversion units (an example of first photoelectric conversion units) 11b and low-sensitivity photoelectric conversion units (an example of second photoelectric conversion units) 11a. In the following description, the relatively high-sensitivity photoelectric conversion units 11b and the relatively low-sensitivity photoelectric conversion units 11a, may be collectively referred to as the photoelectric conversion units 11.

A solid-state imaging device 20 is provided with a plurality of vertical transfer sections 12 for transferring a signal charge read from each photoelectric conversion unit 11 in the column direction, a horizontal transfer section 13 for transferring the signal charged, which are transferred from each of the plurality of vertical transfer sections 12, in the row direction, and an output amplifier 14 for outputting voltage signals corresponding to the signal charges from the horizontal transfer section 13.

The vertical transfer sections 12 include a plurality of vertical transfer channels (not shown) that are formed on the semiconductor substrate so as to correspond to the plurality of photoelectric conversion units 11 being disposed in the column direction, a plurality of vertical transfer electrodes V1 to V8 each of which is formed so as to intersect the respective vertical transfer channels (the vertical transfer electrodes V1 to V8 are provided to extend in a left-to-right direction in FIG. 2), and charge read areas that read the signal charges of the photoelectric conversion units 11 into the vertical transfer channels. The vertical transfer electrodes V1 to V8 of the respective vertical transfer sections 12 are provided to extend between the rows of the photoelectric conversion units 11 to have meandering configurations. The vertical transfer sections 12 are driven by vertical transfer pulses output from the drive section 104 to the vertical transfer electrodes V1 to V8, to transfer signal charges.

The horizontal transfer section 13 has a horizontal transfer channel formed on the semiconductor substrate which (is not shown) and horizontal transfer electrodes provided on the horizontal transfer channel. The horizontal transfer section 13 is driven in two phases by horizontal transfer pulses φH1 and φH2 output from the drive section 104 to the horizontal transfer electrodes.

The output amplifier 14 outputs, as the image signals, voltage value signals in accordance with the quantities of the signal charges transferred to a transfer-direction end portion of the horizontal transfer section 13.

The above description is given using the expressions "vertical" and "horizontal" such as the vertical transfer section 12 and the horizontal transfer section 13, and terms "vertical" and "horizontal" mean "one direction" in parallel with the surface of the semiconductor substrate and "a direction substantially perpendicular to the one direction", respectively.

In the solid-state imaging device, color filters (not shown) are provided on the light receiving areas in order to detect color image signals.

"R", "G", "B", "r", "g", and "b" shown on the respective photoelectric conversion units 11 indicate colors of the color filters laminated on the respective photoelectric conversion units 11. "R" and "r" indicate red, "G" and "g" indicate green, and "B" and "b" indicate blue. The photoelectric conversion units 11 at positions indicated by "R", "G", and "B" represent the relatively high-sensitivity photoelectric conversion units, while the photoelectric conversion units 11 at positions indicated by "r", "g", and "b" represent the relatively low-sensitivity photoelectric conversion units. Signals corresponding to light detected by the high-sensitivity photoelectric conversion units 11b may be referred to as first pixel signals or, in some cases, as R signals, G signals, and B signals correspondingly to the respective colors. Signals corresponding to light detected by the low-sensitivity photoelectric conversion units 11a may be referred to as low-sensitivity pixel signals or, in some cases, as r signals, g signals, and b signals correspondingly to the respective colors.

In the present embodiment, the photoelectric conversion units 11 are arranged in the row and column directions on the surface of the semiconductor substrate, and the high-sensitivity photoelectric conversion units 11b and the low-sensitivity photoelectric conversion units 11a are arranged at an identical arrangement pitch at positions that are shifted from each other by one half of the arrangement pitch in the row and column directions. Specifically, both of the high-sensitivity photoelectric conversion units 11b and the low-sensitivity photoelectric conversion units 11a have the Bayer arrangement of red, green, and blue. The low-sensitivity photoelectric units 11a indicated by "r", "g", and "b" are arranged in odd rows, while the high-sensitivity photoelectric conversion units 11b indicated by "R", "G", and "B" are arranged in even rows. The photoelectric conversion units corresponding to the same color (for example, "r" and "R") in vertically adjacent rows are arranged with being shifted by one half of the arrangement pitch from each other in the row and column directions. Among the photoelectric conversion units 11 corresponding to the same color, the high-sensitivity photoelectric conversion units 11b and the low-sensitivity photoelectric conversion units 11a are arranged at positions adjacent to each other in the arrangement on the semiconductor substrate.

In order to change the configuration of elements constituting the low-sensitivity photoelectric conversion units 11a and the high-sensitivity photoelectric conversion units 11b, an area of the light receiving area may be varied for each photoelectric conversion unit 11, or a light collecting area may be varied using a microlens disposed above the photoelectric conversion unit 11. A method for changing the sensitivity of the photoelectric conversion unit is not particularly limited.

Figure 3:
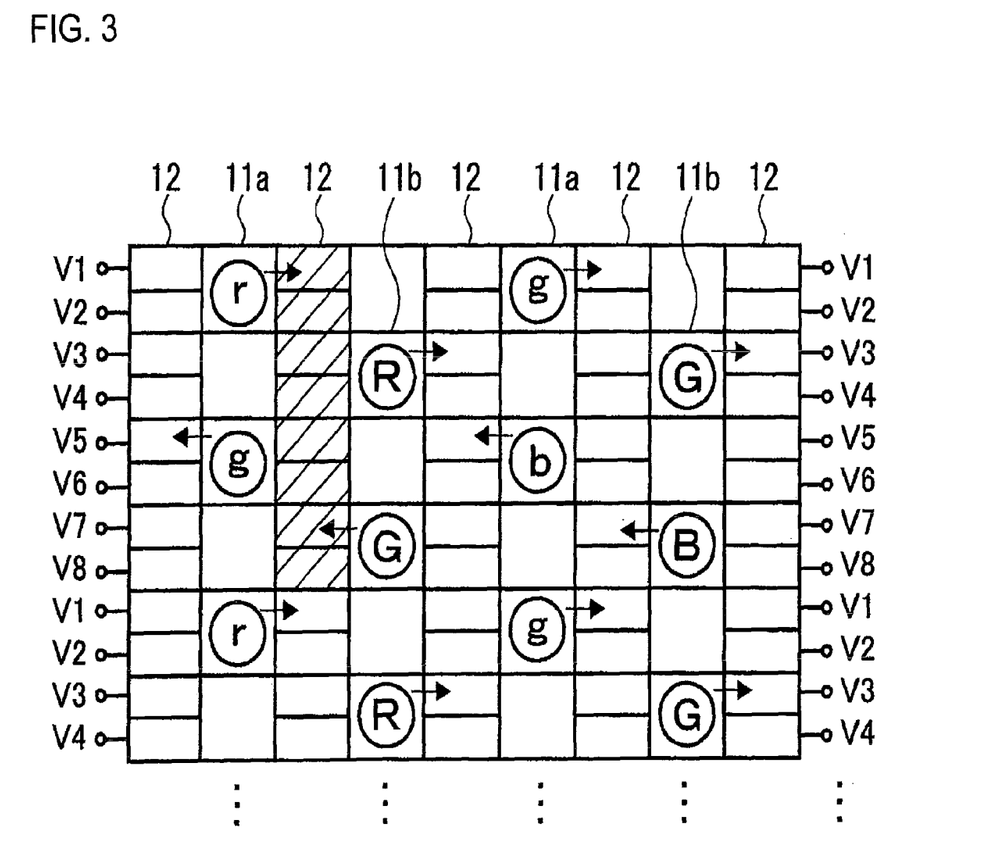
FIG. 3 is a view for illustrating a state when pixel signals of photoelectric conversion elements are read into vertical transfer sections.

FIG. 3 is a view for illustrating a state when pixel signals of the photoelectric conversion elements are read into the vertical transfer sections.

In the solid-state imaging device of the present embodiment, among the low-sensitivity photoelectric conversion units 11a, the low-sensitivity pixel signals of the photoelectric conversion units 11a in the odd rows and the low-sensitivity pixel signals of the photoelectric conversion units 11a in the even rows are read into the vertical transfer sections 12 that are located on mutually opposite sides. Among the high-sensitivity photoelectric conversion units 11b, the high-sensitivity pixel signals of the photoelectric conversion units 11b in the odd rows and the first pixel signals of the photoelectric conversion units 11b in the even rows are read into the vertical transfer sections 12 that are located on mutually opposite sides. In other words, a row of the low-sensitivity photoelectric conversion units 11a and a row of the high-sensitivity photoelectric conversion units 11a are vertically arranged so as to correspond to each other, and the pixel signals of the photoelectric conversion units 11a and 11b in the corresponding two rows are read into the vertical transfer sections 12 on the same side, while the pixel signals of the photoelectric conversion units 11a and 11b in two rows immediately above and below the corresponding two rows are read into the vertical transfer sections 12 on the opposite side thereto.

In FIG. 3, a hatched area represents an area in the vertical transfer section 12 where a r signal read from the low-sensitivity photoelectric conversion unit 11a is vertically transferred. When the r signal detected in the photoelectric conversion unit 11a is read into the right side in the drawing, the g signal detected in the photoelectric conversion unit 11a, which is adjacent thereto in the column direction, is read into the left side in the drawing. As a result, since the r signal read into the vertical transfer section 12 does not interfere with an area to which the g signal or the b signal is transferred, it becomes possible to perform eight-phase transfer drive when the vertical transfer electrodes V1 to V8 are used. Similarly, since the first pixel signals (the R signal, the G signal, or the B signal) dose not interfere with areas to which the first pixel signals read from other photoelectric conversion units are transferred, it becomes possible to perform the eight-phase transfer drive.

Figure 4:
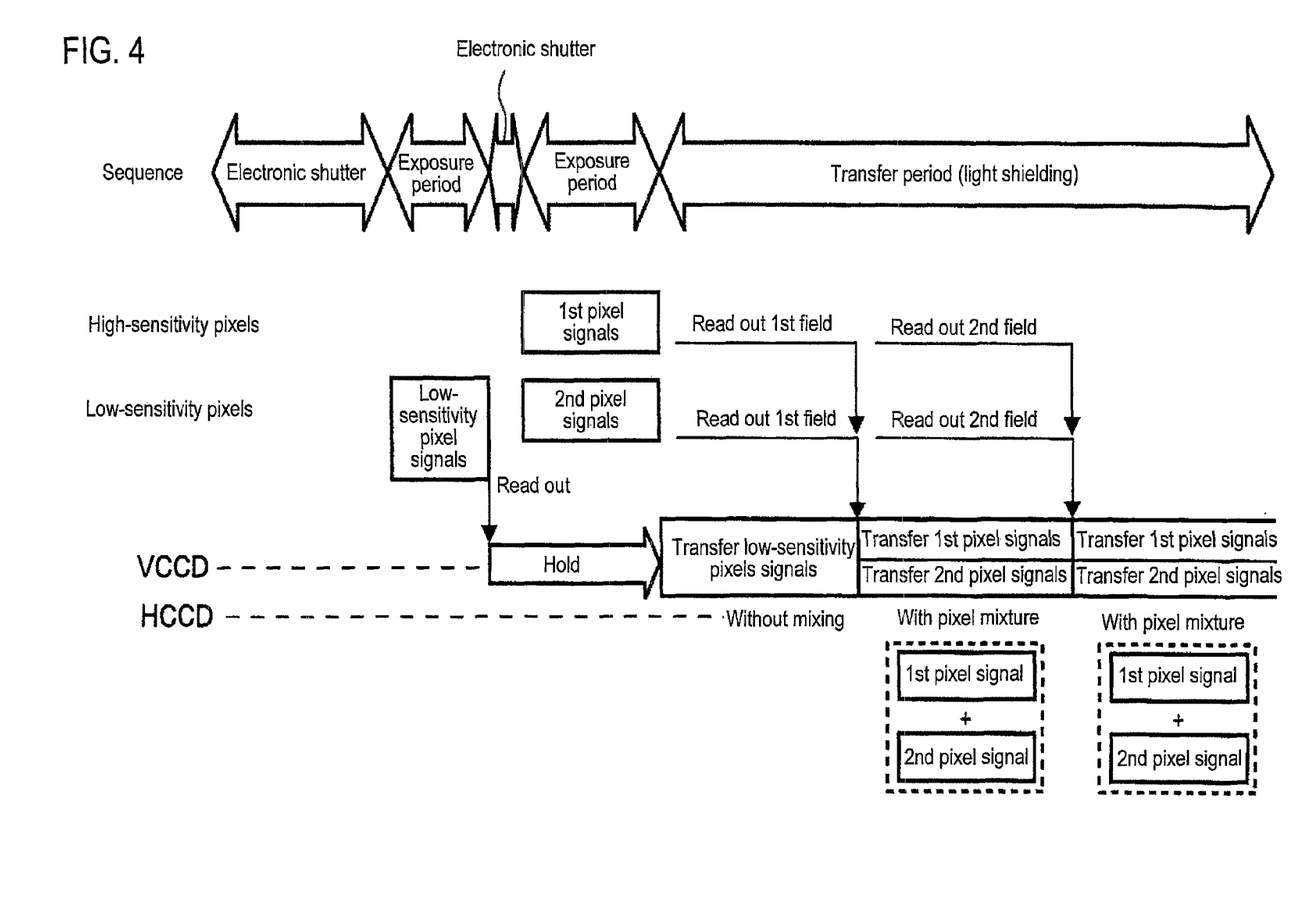
FIG. 4 is a view for illustrating one example of an operation of the imaging apparatus of the present embodiment.

FIG. 4 is a view for illustrating one example of an operation of the imaging apparatus of the present embodiment.

In the solid-state imaging device of the present embodiment, the high-sensitivity photoelectric conversion units 11b, which constitute the high-sensitivity pixels, serve as first photoelectric conversion units, and the low-sensitivity photoelectric conversion units 11a, which constitute the low-sensitivity pixels, serve as second photoelectric conversion units. First, the solid-state imaging device of the present embodiment starts to expose the low-sensitivity photoelectric conversion units 11a. At the end of the exposure period for low-sensitivity photographing, an electronic shutter is driven, and the low-sensitivity pixel signals detected by the low-sensitivity photoelectric conversion units 11a are read into the vertical transfer sections 12. The read low-sensitivity pixel signals are temporarily held in the vertical transfer sections 12.

Next, it is started to expose the high-sensitivity photoelectric conversion units 11b. Simultaneously, it is started to expose the low-sensitivity photoelectric conversion units 11a as well. At the end of the high-sensitivity exposure period, the first pixel signals detected by the high-sensitivity photoelectric conversion units 11b are read, and the second pixel signals detected by the low-sensitivity photoelectric conversion units 11a are read. After the low-sensitivity pixel signals temporarily held in the vertical transfer sections 12 are transferred, the first pixel signals and the second pixel signals are read. By transferring the low-sensitivity pixel signals detected by the low-sensitivity photoelectric conversion units 11a after the end of the exposure period for the first pixel signals, influence of smear can be reduced.

In the present embodiment, during a transfer period, the first pixel signals detected by the high-sensitivity photoelectric conversion units 11b and the second pixel signals detected by the low-sensitivity photoelectric conversion units 11a are mixed in the vertical transfer sections 12, the mixed signals serve as high-sensitivity pixel signals. Thereafter, the high-sensitivity pixel signals are output to the analog signal processing section 102. In the analog signal processing section 102, the low-sensitivity pixel signals output previously and the high-sensitivity pixel signals are combined to produce a color image.

Since the image can be produced by combining the first pixel signals obtained from the high-sensitivity photoelectric conversion units 11b and the low-sensitivity pixel signals obtained from the low-sensitivity photoelectric conversion units 11a, a wide dynamic range can be achieved. Furthermore, by mixing the second pixel signals from the low-sensitivity photoelectric conversion units 11a with the first pixel signals, signals with higher sensitivity can be obtained and the dynamic range thereof can be further expanded. By detecting a part of high-sensitivity information using the low-sensitivity photoelectric conversion units 11a and mixing pixel signals, the charge quantity is increased so that further noise reduction can be achieved as compared with a process for detecting high-sensitivity information only from the high-sensitivity photoelectric conversion units 11b.

In addition, since the second pixel signals to be mixed with the first pixel signals are detected during the exposure period for the low-sensitivity photoelectric conversion units 11a, the exposure period for all pixels can be substantially shortened. Moreover, temporal correlation between the exposure periods for the high-sensitivity signals and the low-sensitivity signals is enhanced so that a more natural image can be produced when, e.g., a subject in motion is photographed. At this time, since the low-sensitivity pixel signals are not mixed with the first pixel signals, the low-sensitivity signals can be detected without an exposure control such as a high-speed electronic shutter or the like at being extremely shortened at the time of the exposure for the low-sensitivity pixel signals.

Figure 5:
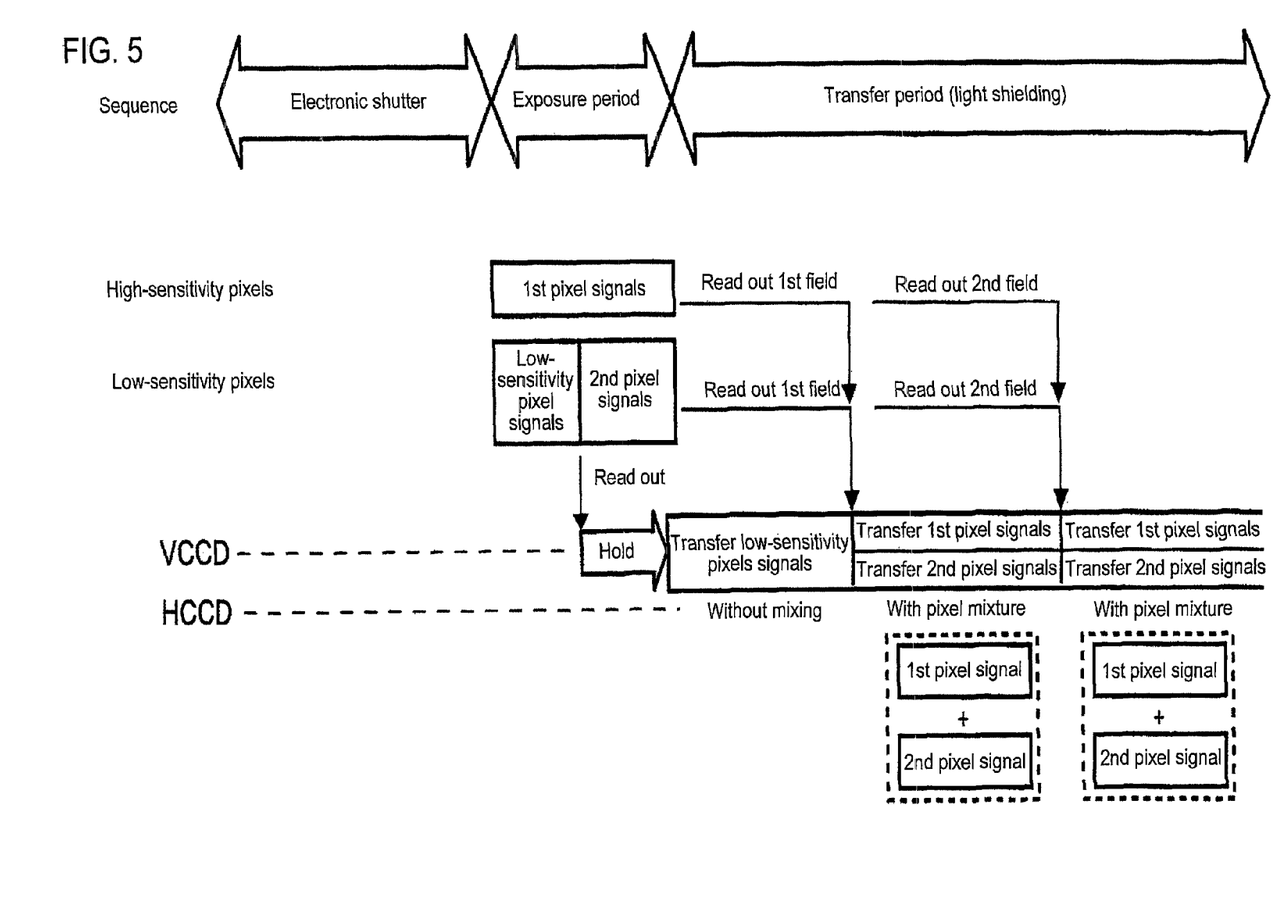
FIG. 5 is a view for illustrating another example of the operation of the imaging apparatus of the present embodiment.

FIG. 5 is a view for illustrating another example of the operation of the imaging apparatus of the present embodiment. The high-sensitivity photoelectric conversion units 11b, which constitute the high-sensitivity pixels, serve as first photoelectric conversion units, and the low-sensitivity photoelectric conversion units 11a, which constitute the low-sensitivity pixels, serve as second photoelectric conversion units.

In the present example, upon start of the exposure period, it is started to detect the first pixel signals in the high-sensitivity photoelectric conversion units 11b, and it is simultaneously started to detect the low-sensitivity pixel signals in the low-sensitivity photoelectric conversion units 11a. After a predetermined time period during the exposure time elapses, the low-sensitivity photoelectric conversion units 11a are driven and controlled to read the low-sensitivity pixel signals into the vertical transfer sections 12. Then, it is immediately start to detect the second pixel signals. The read low-sensitivity pixel signals are held in the vertical transfer sections 12 during the exposure period. After the end of the exposure period, upon start of a transfer period, the first pixel signals detected in the high-sensitivity photoelectric conversion units 11b and the second pixel signals detected in the low-sensitivity photoelectric conversion units 11a are read into the vertical transfer sections 12 on a field basis. After the low-sensitivity pixel signals held in the vertical transfer sections 12 are transferred, the first pixel signals and the second pixel signals are read. For each field, the first pixel signals and the second pixel signals are mixed in the horizontal transfer section 13 to produce the high-sensitivity pixel signals, and the high-sensitivity pixel signals are output from the output amplifier 14.

In accordance with the read operation shown in FIG. 5, the exposure period for detecting the low-sensitivity pixel signals and the second pixel signals in the low-sensitivity photoelectric conversion units overlaps the exposure period for detecting the first pixel signals in the high-sensitivity photoelectric conversion units. The term "overlap" used herein includes the case where the exposure period for detecting the low-sensitivity pixel signals and the second pixel signals completely matches the exposure period for detecting the first pixel signals in the high-sensitivity photoelectric conversion units, and the case where they partially overlap each other. With this configuration, since the high-sensitivity photoelectric conversion units and the low-sensitivity photoelectric conversion units can be simultaneously, the correlation between the signal charges thereof can be further enhanced.

Next, description will be given on another example of the structure of the imaging apparatus according to the present invention with reference to the drawings. In this embodiment, as for the components having the same structures and performing the same operations as those described above, description thereof will be simplified or omitted by assigning the same or corresponding reference numerals in the drawings.

Figure 6:
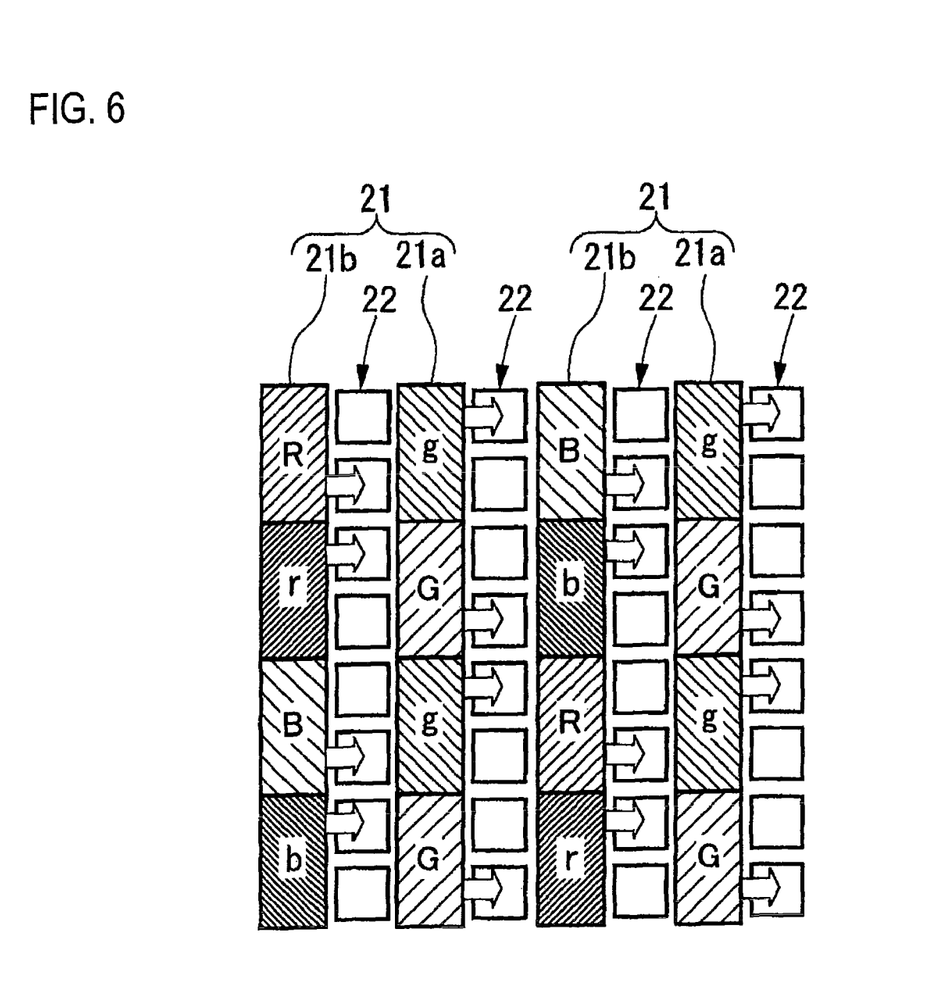
FIG. 6 is a view for illustrating one example of a read operation in another arrangement structure of photoelectric conversion units.
Figure 7:
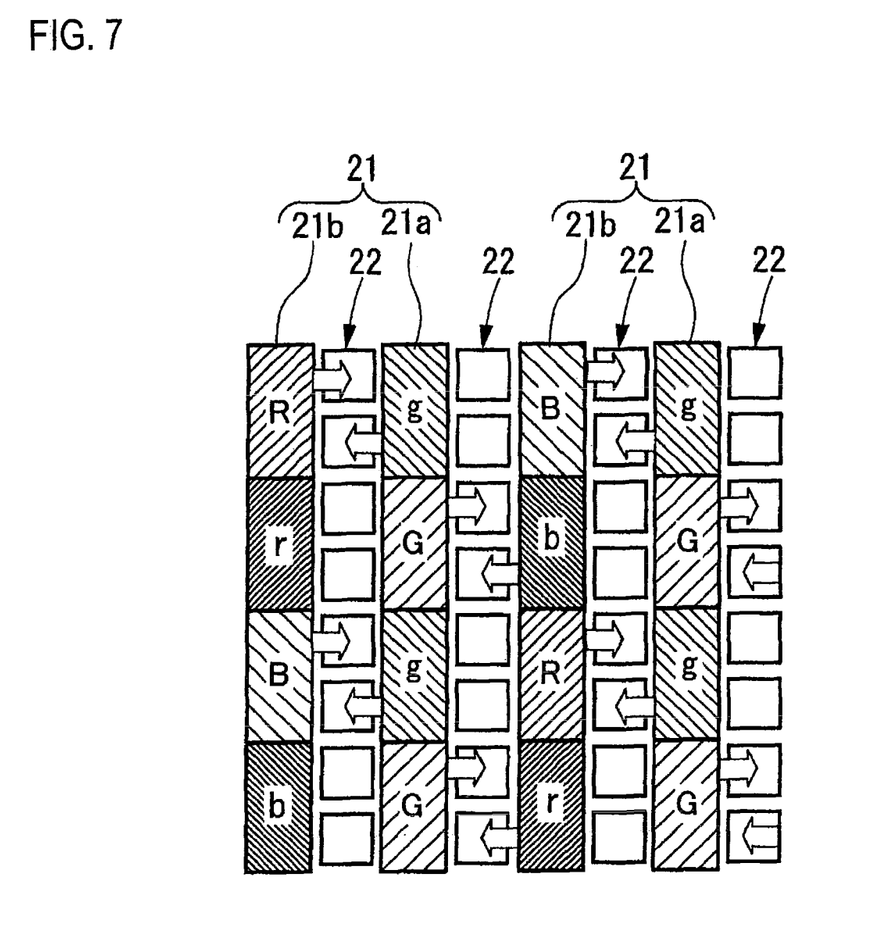
FIG. 7 is a view for illustrating another example of the read operation in the other arrangement structure of the photoelectric conversion units.

In solid-state imaging devices shown in FIGS. 6 and 7, photoelectric conversion units 21a and 21b are disposed in row and column directions on a surface of a semiconductor substrate, and the high-sensitivity photoelectric conversion units 21b and the low-sensitivity photoelectric conversion units 21a are arranged at an identical arrangement pitch in an arrangement obtained by slanting square lattice configuration having a 2×2 period.

In the solid-state imaging device of FIG. 6, pixel signals detected in the high-sensitivity photoelectric conversion units 21b and pixel signals detected in the low-sensitivity photoelectric conversion units 21a are read into vertical transfer sections 22 on the same side. At the time of transfer thereof, the high-sensitivity pixel signals are read into n-th, (n+4)-th, (n+8)-th . . . (n is an arbitrary integer such as n=1, 2, 3 . . . ) vertical transfer electrodes in the column direction among a plurality of vertical transfer electrodes provided to extend in the column direction. Also, the low-sensitivity pixel signals are read into the (n+1)-th, (n+5)-th, (n+9)-th . . . vertical transfer electrodes in the column direction among the plurality of vertical transfer electrodes provided to extend in the column direction. In accordance with the arrangement of the photoelectric conversion units shown in FIG. 6, by applying drive pulses to the vertical transfer electrodes, the first pixel signals, the low-sensitivity pixel signals, and the second pixel signals detected in the low-sensitivity photoelectric conversion units can be vertically transferred with four-phase drive.

In accordance with the arrangement of the photoelectric conversion units 21 of FIG. 6, among the photoelectric conversion units 21 corresponding to the same color, the high-sensitivity photoelectric conversion units 21b and the low-sensitivity photoelectric conversion units 21a are disposed at positions adjacent to each other in the column direction. In this configuration, the first pixel signals and the second pixel signals are mixed in the vertical transfer sections and are output from the output amplifier unit. Alternatively, the first pixel signals and the second pixel signals may be mixed in the horizontal transfer section.

In the solid-state imaging device of FIG. 7, the pixel signals detected in the high-sensitivity photoelectric conversion units 21b and the pixel signals detected in the low-sensitivity photoelectric conversion units 21a are read into the vertical transfer sections 22 on mutually opposite sides. In FIG. 7, the pixel signals detected in the high-sensitivity photoelectric conversion units 21b are read into the vertical transfer sections 22 on the right side thereof in the drawing, while the pixel signals detected in the low-sensitivity photoelectric conversion units 21a are read into the vertical transfer sections 22 on the left side thereof in the drawing. At the time of transfer thereof, the high-sensitivity pixel signals are read into the n-th, (n+4)-th, (n+8)-th . . . vertical transfer electrodes in the column direction among the plurality of vertical transfer electrodes provided to extend in the column direction and, the low-sensitivity pixel signals are read into the (n+1)-th, (n+5)-th, (n+9)-th . . . vertical transfer electrodes in the column direction among the plurality of vertical transfer electrodes provided to extend on the opposite side. In accordance with the arrangement of the photoelectric conversion units shown in FIG. 7, by applying drive pulses to the vertical transfer electrodes, the first pixel signals, the low-sensitivity pixel signals, and the second pixel signals detected in the low-sensitivity photoelectric conversion units can be vertically transferred with the four-phase drive.

In this configuration, the first pixel signals and the second pixel signals are mixed in the horizontal transfer section and are output from the output amplifier. Also, at transfer-direction end portions of the vertical transfer sections 22, line memories may be further provided.

In the arrangement structures of the photoelectric conversion units shown in FIGS. 6 and 7, the pixel signals can also be read in the same manner as the read operation of the solid-state imaging device having the arrangement structure of the photoelectric conversion units shown in FIG. 2. That is, an image can be produced by combining the high-sensitivity pixel signals obtained by mixing the first pixel signals and the second pixel signals and the low-sensitivity pixel signals obtained from the low-sensitivity photoelectric conversion units 21a. Also, the high-sensitivity pixel signals is produced by mixing the first pixel signals obtained from the high-sensitivity photoelectric conversion units 21b and the second pixel signals obtained from the low-sensitivity photoelectric conversion units 21a, signals with higher sensitivity can be obtained and a dynamic range can be further expanded.

It should be noted that the present invention is not limited to the foregoing embodiments, and that various improvements and modifications may of course be made as needed.

For example, by mixing all of the low-sensitivity pixel signals and the second pixel signals with the first pixel signals generated in the high-sensitivity photoelectric conversion units in signal processing, new high-sensitivity pixel signals may be generated. With this configuration, the same exposure period can be set for the new high-sensitivity pixel signals and for the low-sensitivity pixel signals, and the correlation therebetween can be further enhanced.

What is claimed is:

1. An imaging apparatus comprising:
   a solid-state imaging device including a plurality of photoelectric conversion units having plural first photoelectric conversion units and plural second photoelectric conversion units that are regularly arranged on a semiconductor substrate;
   a drive section that controls the solid-state imaging device to read first pixel signals that are accumulated over an exposure period, from the first photoelectric conversion units, respectively, to read low-sensitivity pixel signals from the second photoelectric conversion units, respectively,
to read second pixel signals that are accumulated in at least a part of the exposure period, from the second photoelectric conversion units, and
to mix the first pixel signals and the second signals and produce high-sensitivity pixel signals; and
a signal processing section that combines the low-sensitivity pixel signals and the high-sensitivity pixel signals and produces an image.

2. The imaging apparatus of claim 1, wherein the first photoelectric conversion unit and the second photoelectric conversion unit, which correspond to an identical color and are to be mixed, are disposed at positions adjacent to each other on the semiconductor substrate.

3. The imaging apparatus of claim 1, wherein
the photoelectric conversion units are disposed on a surface of the semiconductor substrate in row and column directions, and
the first photoelectric conversion units and the second photoelectric conversion units are arranged at an identical arrangement pitch at positions shifted from each other in the row and column directions by one half of the arrangement pitch.

4. The imaging apparatus of claim 3, further comprising:
a vertical transfer section that transfers signal charges that are read from the photoelectric conversion units, in the column direction; and
a horizontal transfer section that transfers the signal charges, which are transferred from the vertical transfer section, in the row direction, wherein
the vertical transfer section includes
a plurality of vertical transfer channels that are formed on the semiconductor substrate so as to correspond to the photoelectric conversion units being disposed in the column direction,
a plurality of vertical transfer electrodes each of which is formed so as to intersect the plurality of vertical transfer channels, and
charge reading areas that read the signal charges of the photoelectric conversion units into the vertical transfer channels, and
the first pixel signals and the second signals are mixed in the horizontal transfer section.

5. The imaging apparatus of claim 1, wherein
the photoelectric conversion units are disposed on a surface of the semiconductor substrate in row and column directions, and
the first photoelectric conversion units and the second photoelectric conversion units are arranged at an identical arrangement pitch in an arrangement obtained by slanting a square lattice configuration having a 2×2 period.

6. The imaging apparatus of claim 5, further comprising:
a vertical transfer section that transfers signal charges that are read from the photoelectric conversion units, in the column direction; and
a horizontal transfer section that transfers the signal charges, which are transferred from the vertical transfer section, in the row direction, wherein
the vertical transfer section includes
a plurality of vertical transfer channels that are formed on the semiconductor substrate so as to correspond to the photoelectric conversion units being disposed in the column direction,
a plurality of vertical transfer electrodes each of which is formed so as to intersect the plurality of vertical transfer channels, and
charge reading areas that read the signal charges of the photoelectric conversion units into the vertical transfer channels, and
the first pixel signals and the second signals are mixed in the vertical transfer section or the horizontal transfer section.

7. A signal processing method for an imaging apparatus including a solid-state imaging device, wherein the solid-state imaging device includes a plurality of photoelectric conversion units having plural first photoelectric conversion units and plural second photoelectric conversion units that are regularly arranged on a semiconductor substrate, the method comprising:
reading first pixel signals that are accumulated over an exposure period, from the first photoelectric conversion units, respectively;
reading low-sensitivity pixel signals from the second photoelectric conversion units, respectively;
reading second pixel signals that are accumulated in at least a part of the exposure period, from the second photoelectric conversion units;
mixing the first pixel signals and the second pixel signals to produce a high-sensitivity pixel signal;
mixing the low-sensitivity pixel signals and the high-sensitivity pixel signals to produces an image.

8. The method of claim 7, wherein, the first photoelectric conversion unit and the second photoelectric conversion unit, which correspond to identical color and are to be mixed, are disposed at positions adjacent to each other on the semiconductor substrate.

9. The method of claim 7, wherein
the photoelectric conversion units are disposed on a surface of the semiconductor substrate in row and column directions, and
the first photoelectric conversion units and the second photoelectric conversion units are arranged at an identical arrangement pitch at positions shifted from each other in the row and column directions by one half of the arrangement pitch.

10. The method of claim 9, further comprising:
transferring signal charges read from the photoelectric conversion units in the column direction, by a vertical transfer section; and
transferring the signal charges, which are transferred from the vertical transfer section, in the row direction by a horizontal transfer unit, wherein
the vertical transfer section includes
a plurality of vertical transfer channels that are formed on the semiconductor substrate so as to correspond to the photoelectric conversion units being disposed in the column direction,
a plurality of vertical transfer electrodes each of which is formed so as to intersect the plurality of vertical transfer channels, and
charge reading areas that read the signal charges of the photoelectric conversion units into the vertical transfer channels, and
the first pixel signals and the second signals are mixed in the horizontal transfer section.

11. The method of claim 7, wherein
the photoelectric conversion units are disposed on a surface of the semiconductor substrate in row and column directions, and
the first photoelectric conversion units and the second photoelectric conversion units are arranged at an identical arrangement pitch in an arrangement obtained by slanting a square lattice configuration having a 2×2 period.

12. The method of claim 11, further comprising:
transferring signal charges read from the photoelectric conversion units in the column direction, by a vertical transfer section; and
transferring the signal charges from the vertical transfer section in the row direction, by a horizontal transfer section, wherein
the vertical transfer section includes
   a plurality of vertical transfer channels that are formed on the semiconductor substrate so as to correspond to the photoelectric conversion units being disposed in the column direction,
   a plurality of vertical transfer electrodes each of which is formed so as to intersect the plurality of vertical transfer channels, and
   charge reading areas that read the signal charges of the photoelectric conversion units into the vertical transfer channels, and
the first pixel signals and the second signals are mixed in the vertical transfer section or the horizontal transfer section.

* * * * *